United States Patent [19]

Pascuzzi

[11] 4,082,447
[45] Apr. 4, 1978

[54] WET GATE EMBODIED IN A PHOTOGRAPHIC STRIP FILM PRINTER

[75] Inventor: Louis Ferdinand Pascuzzi, Mount Vernon, N.Y.

[73] Assignee: Cineffects Color Laboratory Inc., New York, N.Y.

[21] Appl. No.: 765,085

[22] Filed: Feb. 3, 1977

[51] Int. Cl.² .................... G03B 27/52; G03B 27/68
[52] U.S. Cl. ........................................ 355/30; 355/52
[58] Field of Search .................. 355/18, 30, 50, 52

[56] References Cited

U.S. PATENT DOCUMENTS

| | | | |
|---|---|---|---|
| 2,461,668 | 2/1949 | Thompson | 355/30 |
| 2,987,955 | 6/1961 | Sassenberg | 355/52 X |
| 3,036,216 | 5/1962 | Brody | 355/30 X |
| 3,414,353 | 12/1968 | Schwardt | 355/18 X |
| 3,614,223 | 10/1971 | Ott | 355/30 |
| 3,893,763 | 7/1975 | Ott | 355/52 |

*Primary Examiner*—Donald A. Griffin
*Attorney, Agent, or Firm*—Watson, Leavenworth, Kelton & Taggart

[57] ABSTRACT

A wet gate assembly in a photographic strip film printer having a pair of complementary gate halves demountably fastened together to form between opposed faces thereof a through strip film path from top entrance ends down to bottom exit ends thereof. A pair of light-transmitting optical windows having substantially aligned transverse central axes respectively are fitted into one of a pair of opposed apertures that are separately formed in these gate halves with these windows located in transversely spaced-apart relation on opposite sides of the film path to define a chamber therebetween. Cooperative leakage blocking means are provided on the opposed faces of the gate halves along opposite sides of the windows to close the sides of the chamber. Transverse leakage blocking means are cooperatively provided on the entrance ends of the gate halves for preventing leakage up out of the gate assembly chamber while permitting strip film to be drafted down therethrough between the transversely spaced windows. A pair of transverse manifolds are provided with one on each of the gate halves above the window in such gate half, and each manifold has means adapted to be connected to a source of pressurized liquid and provided with transversely spaced passage outlets communicating with the upper portion of the chamber. A pair of cooperating transverse squeegee rollers each rotatably mounted at the face of and by one of these gate halves below the window therein with at least an arcuate longitudinal zone of each roller extending laterally forward beyond the face of the gate half supporting it with the opposed arcuate longitudinal zones of these rollers biased toward longitudinal contact with each other; and these rollers extend laterally to cooperating positions relative to the side leakage blocking means and in cooperative sealing relation with respect to each other for closure of the bottom of the chamber.

Means behind each of these rollers defines in the gate half supporting the latter a transverse channel connectable to suction means for drawing off liquid from the chamber at said rollers while substantially blocking leakage below the latter.

5 Claims, 8 Drawing Figures

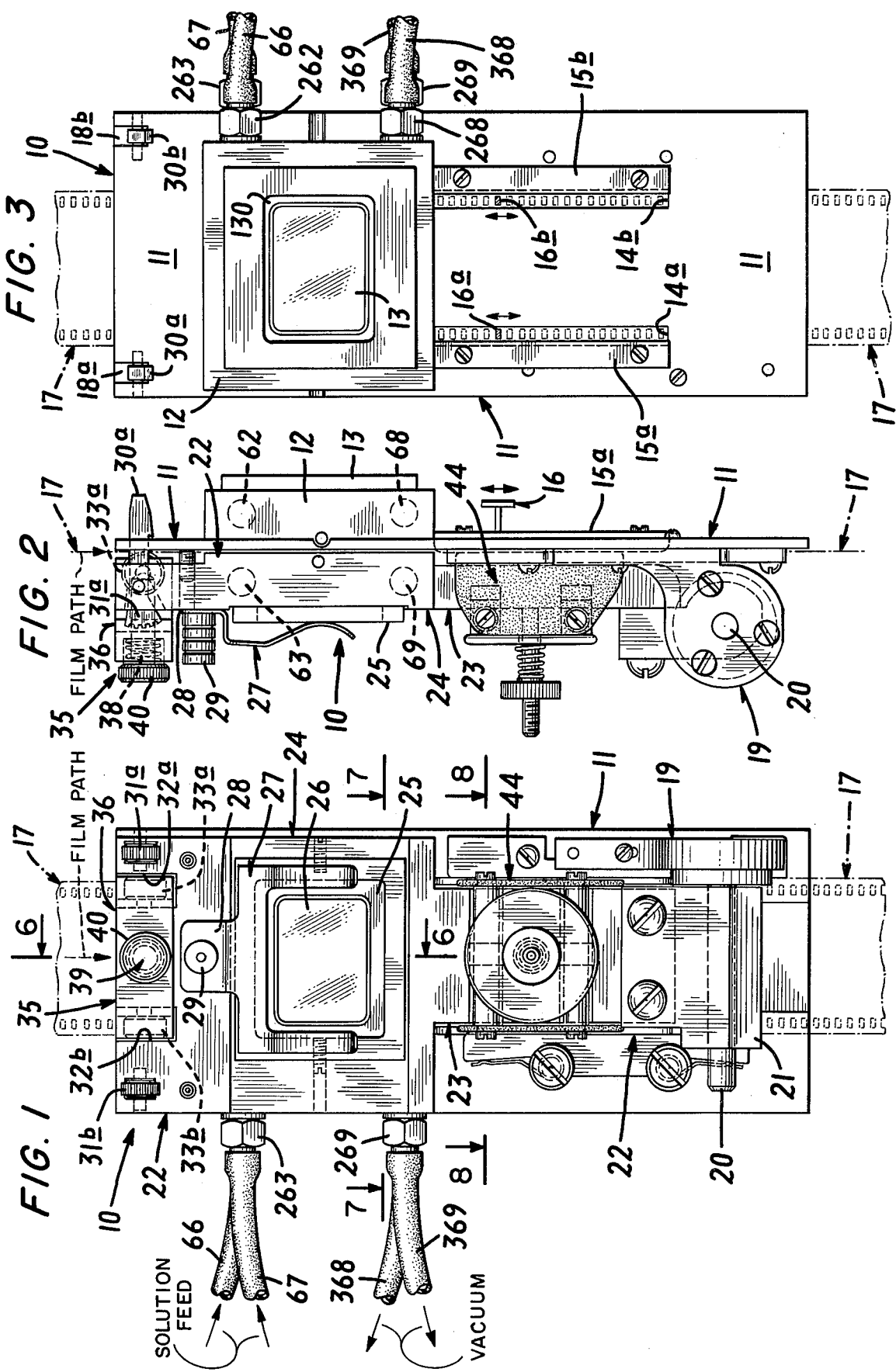

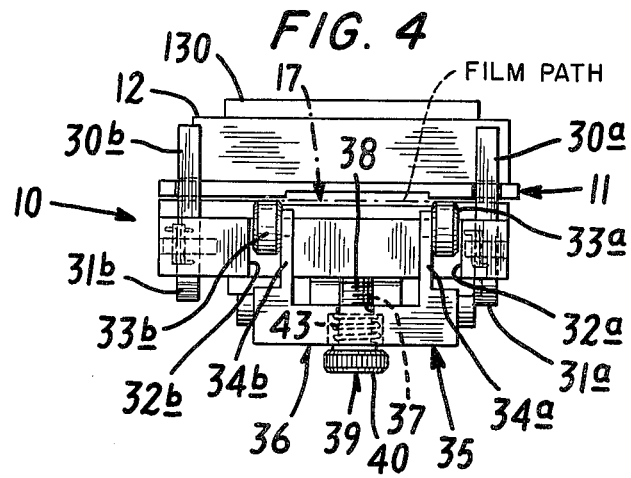
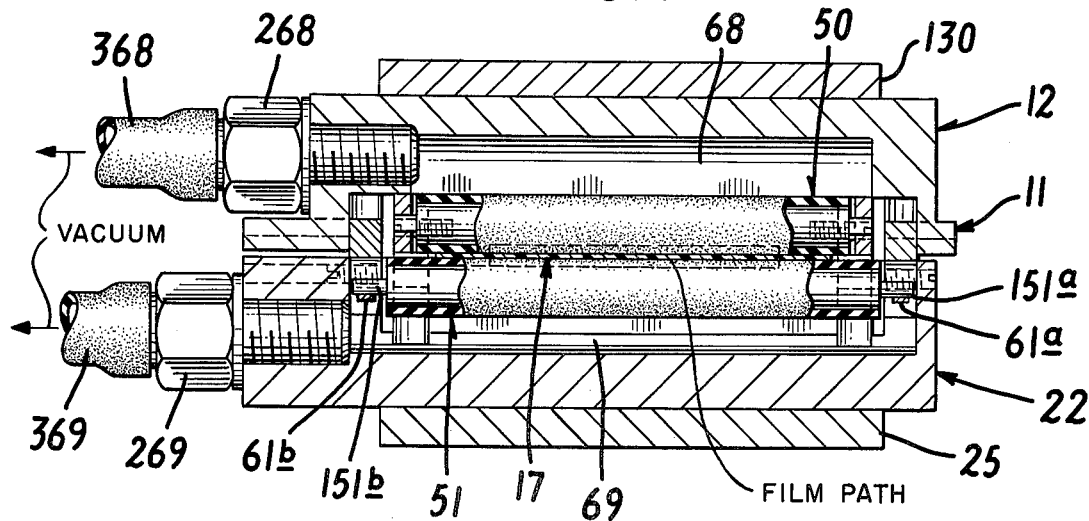
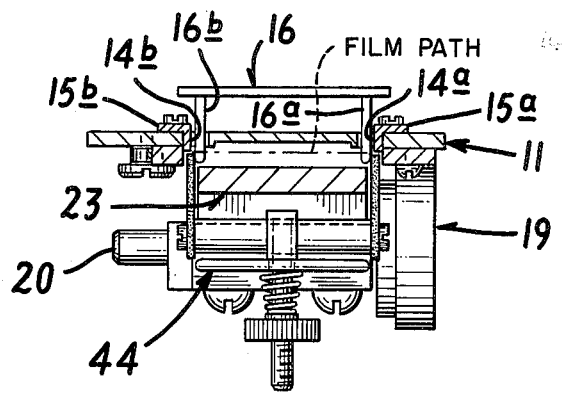

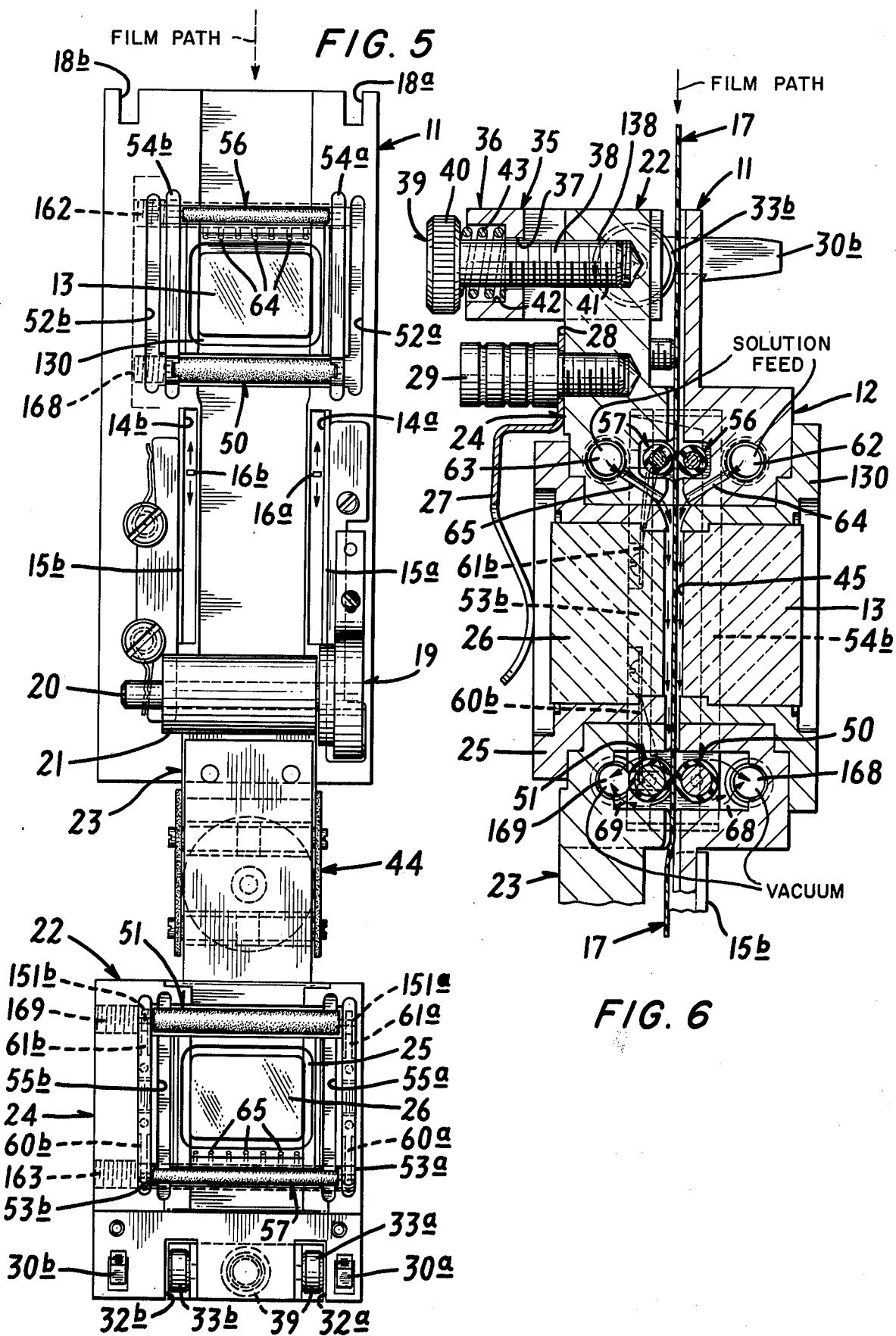

WET GATE EMBODIED IN A PHOTOGRAPHIC STRIP FILM PRINTER

BACKGROUND AND SUMMARY

The present invention relates to a wet gate construction designed for advantageous use with a photographic strip film printer, e.g., a reduction printer. The purpose of such equipment can, to advantage, be the drafting of photographic strip film through a liquid-containing chamber defined between a pair of gate halves which are equipped with opposed and aligned, transversely spaced-apart optical windows, such as is proposed in the U.S. Ott U.S. Pat. No. 3,614,223 of Oct. 19, 1971. The present wet gate construction is an appreciable improvement upon that disclosed in that patent, and specifically in that it assures an appreciably greater efficiency in stripping the liquid within the gate assembly from the traveling film surfaces at the chamber exit end. This prior art patent depends solely upon evacuating equipment at the strip film exit end of the gate which has been found to demand very careful and costly fitting of opposed surfaces of the gate halves together to avoid undue leakage of the gate chamber, particularly at the exit end thereof. This is particularly true with respect to the film strip exit slot since it must be sufficiently wide enough to pass therethrough film strip splices without damage to these splices or adjacent sections of the film. Consequently, leakage is excessive and must be accommodated by elaborate and undesirably cost increasing collectors of such excessive leakage.

It is a general object of the present invention to overcome such problems by relatively simple and reliable film exit end leakage reducing means of the present invention.

A more specific object of the invention is to supplement the evacuating equipment at the film exit end with a set of opposed cooperating squeegee rollers which are biased toward each other preferably with resilient means that permit exit transport out therebetween of film strips of various thicknesses and lap joints thereof while maintaining snug contact of the film surfaces on its opposite sides by the opposed rollers.

A still further object of the invention is to utilize to advantage such a set of squeegee rollers at the top entrance end to simplify also the liquid seal thereat in supplement to the set thereof at the bottom exit end.

The present invention may be embodied to appreciable advantage in a wet gate assembly construction which includes a pair of complementary gate halves demountably fastened together to form between opposed faces thereof a through strip film path from a top entrance end down to a bottom exit end thereof. A pair of light-transmitting optical windows having substantially aligned transverse central axes respectively are fitted into one of a pair of opposed apertures separately formed in the gate halves with these windows located in transversely spaced-apart relation on opposite sides of the strip film path to define a chamber therebetween. Cooperative leakage blocking means are provided on the opposed faces of these gate halves along opposite sides of the windows which close the sides of the chamber efficiently. Transverse leakage blocking means are cooperatively provided on the entrance ends of the gate halves for preventing leakage up out of the gate assembly chamber while permitting strip film to be drafted down therethrough between the transversely spaced windows. Each of a pair of transverse manifolds is provided in one of the gate halves about its window with each manifold having means adapted to be connectable to a source of relatively pressurized liquid and provided with transversely spaced passage outlets communicating with the upper portion of the chamber. A pair of cooperating transverse squeegee rollers is provided with each rotatably mounted at the face of and by one of the gate halves below the window therein with at least an arcuate longitudinal zone of each roller extending laterally forward beyond the face of the gate half supporting it with the opposed arcuate longitudinal zones of the pair of rollers being biased toward longitudinal contact with each other. These squeegee rollers extend laterally to cooperating leaking blocking positions relative to the side leakage blocking means and in cooperative sealing relation with respect to each other for closure of the bottom of the chamber. Means define behind each of these rollers in the gate half supporting it a transverse open-face channel connectable to suction means for drawing off liquid from the chamber at these rollers while substantially blocking leakage therebelow.

In such a wet gate assembly the transverse leakage blocking means in the vicinity of the entrance ends of the gate halves to define the top of the liquid chamber advantageously may be in the form of a pair of transverse squeegee rollers with a first one mounted on the inner face of one gate half and the other on the opposed inner face of the other in cooperative relation to the first one. These top squeegee rollers are biased, preferably resiliently, toward each other, and they are located above the top liquid supply passage outlets. The ends of such top pair of squeegee rollers are mounted relative to the side leakage blocking means on the opposed faces of the gate halves along opposite sides of the windows in cooperative leak blocking relation.

Other objects of the invention will in part be obvious and will in part appear from reference to the following detailed description taken in connection with the accompanying drawings, wherein like numerals identify similar parts throughout, and in which:

FIG. 1 is a front elevational view of an embodiment of the wet gate assembly of the present invention, as viewed from the pressure plate side thereof, showing in broken lines a section of a negative film that is being translated down therethrough by a conventional intermittent claw advance of the printer; this view also illustrating portions of tubing to serve as solution or liquid feed toward the top end of this wet gate assembly and sections of tubing therebelow serving to draw off the supplied liquid;

FIG. 2 is a side or edge elevational view of the wet gate assembly illustrated in FIG. 1;

FIG. 3 is a back elevational view of the structure shown in FIG. 1 as viewed from the opposite side thereof;

FIG. 4 is a top plan view of the wet gate assembly illustrated in FIGS. 1, 2, and 3;

FIG. 5 is a front elevational view of the wet gate assembly of FIG. 1, showing the release of the top of the front pressure plate from the back aperture plate so that it swings down to reveal the interior sides of the two gate halves;

FIG. 6 is an enlarged detailed vertical section taken substantially on line 6—6 of FIG. 1;

FIG. 7 is an enlarged transverse sectional view taken substantially on line 7—7 of FIG. 1; and FIG. 8 is a transverse sectional view taken on line 8—8 of FIG. 1.

The wet gate assembly 10 in its closed position may be mounted by its aperture plate 11 secured to an existing casting of the printer. This aperture plate 11 has integral therewith or securely fastened thereto a substantially rectangular and relatively thick mounting boss 12 provided with a rectangular through hole extending to the inner face of this aperture plate and in which a framed rectangular piece of flat optical glass 13 is removably anchored, with the frame 130 thereof being illustrated in FIG. 6 as surrounding the rectangular window.

Below the window boss 12 the aperture plate 11 is provided with a pair of vertical slots 14a and 14b margined on the laterally outer sides thereof by straps 15a and 15b. The downwardly drafting or pull down gate claw mechanism 16 (FIG. 2) is equipped with the usual pair of claws, seen in section at 16a and 16b in FIG. 3, to pull the film strip 17 downward, frame-by-frame, for successive alignment with the window 13.

The top edge of the aperture plate 11 preferably is provided with a pair of slots 18a and 18b in which suitable latching mechanism may engage, as will be explained later. Such latching mechanism cooperates with a hinge structure on the lower section of the aperture plate 11, such as is illustrated at 19 in FIGS. 1 and 2, with hinge pin 20 thereof extending through a knuckle 21 (FIG. 1) for desirably hinging the bottom end of the aperture plate 11 to an outer pressure plate 22.

Knuckle 21 of the hinge structure 19 is suitably anchored to the companion, front pressure plate 22 which, as will be seen in FIGS. 1 and 2 includes a relatively thick arm 23, anchored to the knuckle 21, with an upper extension of this arm being of a width about equal to that of the back aperture plate 11 and of a thickness of about that of the boss 12 of the latter, as will be seen at 24 therein. The relatively wide and thick section 24 of the pressure plate 22 is also provided with a rectangular hole, similar to that in which the framed optical window 13 is anchored for the aperture plate 11. In this rectangular hole of the pressure plate 22 is anchored another rectangular, framed window of optical glass 26 having its frame 25 removably anchored in the rectangular hole of this pressure plate by means of a suitable spring fork 27 having its base tab 28 preferably removably anchored by suitable screw and nut means 29, as is shown in greater detail in FIG. 6.

As will be seen in FIGS. 1 to 3 incl., 4 and 6, the slots 18a and 18b respectively receive notched latch hooks 30a and 30b suitably spring biased in a counterclockwise direction as viewed in FIG. 2 and provided with inner knurled sectors 31a and 31b designed to be manually engaged and swung to release such spring-biased latch hooks for permitting swinging separation of the pressure plate assembly 22 from the aperture plate assembly 11.

The top edge of the pressure plate 22 is provided with a pair of laterally-spaced notches 32a and 32b in which are mounted a pair of rollers 33a and 33b rotatably supported respectively by laterally-spaced legs 34a and 34b of a yoke 35 having a lateral bar 36 from which these roller-carrying legs project, as will best be seen in FIG. 4. As will be understood from FIG. 6, a hole 37 extends back through the yoke bar 36 centrally of the latter through which projects freely the threaded shank 38 of an adjusting screw 39 having an accessible exterior knurled thumb knob 40 for rotation thereby to produce axial translation of the screw shank 38. The threaded tip end 138 of the screw shank 38 is threadably engaged within an internally-threaded socket 41 provided centrally in the outer side of the top end of the pressure plate 22. The hole 37 is counterbored at 42 to provide a socket in which a compression helical spring 43 is nested to provide resilient biasing force against the underside of the thumb knob 40 (see FIGS. 1, 2, 4, and 6). The rollers 33a and 33b are formed of suitable material which will not tend to scratch the surface of the film 17 that is translated longitudinally against these rollers, and thus, e.g., may be made from nylon. This yoke 35 and its pair of rollers 31a and 31b thus securely hold the marginal edges of the film 17 against the inner faces of the upper portion of the aperture plate 11 for guidance of the film in a flat plane on its downward travel through the wet gate assembly 10.

It is also desirable to provide below the liquid chamber of this wet gate assembly a suitable film-guiding, spring-loaded device 44 equipped with runners for guidance of the film as it exits from the liquid containing chamber 45 (FIG. 6) which intervenes the optical glasses 13 and 26. The spring-loaded runners of the device 44 hold the film 17 against the edges of the two tempered rails 15a and 15b which extend inward through the slots 14a and 14b in the aperture plate 11 toward the chamber side of the latter (FIGS. 3 and 5) so as to insure the film being in register with the pull-down claws for accurate frame-by-frame movement thereof.

Means are provided on or within the aperture and pressure plates 11 and 22 in the top areas thereof transversely to close off the top end of the chamber 45 which intervenes the optical glasses 13 and 26, and this may be in the form of a variety of types of means, e.g., such as careful machine facings of opposed portions to be snugly clamped together, or interfitting transverse ribs and grooves, or, as will be indicated hereinafter, a pair of cooperative squeegee rollers. The lower end of the chamber 45 is closed off by a cooperative pair of transverse squeegee rollers 50 and 51 with opposed arcuate longitudinal zones of these rollers being biased, preferably resiliently, toward longitudinal contact with each other. Cooperative leakage blocking means are provided on the opposed faces of these gate halves along opposite sides of the windows to complete the closing of the chamber 50 in cooperation with the upper and lower transverse leakage blocking means.

As will be best understood from FIG. 5 cooperative leakage blocking means are provided on the opposed faces of the gate halves 11 and 22 along opposite sides of the windows 13 and 26 for effective closing of the sides of the chamber 45. These side closures are respectively and preferably in the form of a pair of vertical grooves 52a and 52b in the face of the aperture plate 11 to receive snugly therein a pair of vertical ribs 53a and 53b on the opposed inner face of the section 24 of the pressure plate 22 when swung up about the hinge at 19 for latching to the aperture plate. This cooperative leakage blocking means along opposite sides of the windows is further supplemented by a pair of projecting vertical ribs 54a and 54b that are arranged parallel to the grooves 52a and 52b on the face of the pressure plate 11 in close adjacency and parallelism to these vertical grooves therein, with a pair of vertical grooves 55a and 55b provided on the inner face of the pressure plate section 24 in close adjacency to and on the inner sides of the vertical ribs 53a and 53b, so that such ribs on the aperture plate will nest in the latter grooves on the pressure plate. In the preferred form the vertical ribs 53a and 53b on the inner face of the pressure plate 22 and those at 54a and 54b on the inner face of the aperture plate 11 are provided by inserting them within grooves in those faces and suitably anchoring them in such inserted positions, such as by small screws not shown.

The transverse sealing at the top of the chamber 45 preferably is attained by a pair of cooperating transverse squeegee rollers 56 and 57 which are respectively supported rotatably by stub axles at their ends inserted into holes or slots in the vertical ribs 54a and 54b, and 53a and 53b respectively. This is likewise true with respect to the transverse rotary mounting of the pair of rotatably mounted cooperative squeegee rollers 50 and 51 at the bottom of the chamber 45 (as will be understood from FIGS. 5 and 6). Since a varying thickness of film strip and splices therein must travel between the two pairs of top and bottom squeegee rollers 56 and 57, and 50 and 51 with maintenance of snug contact with the surfaces of the film that is being drafted down therebetween, provision should be made in each pair for at least one of such pair of rollers to be resiliently biased toward the other. It is of course obvious that the ends of all four of the squeegee rollers may be mounted with resilient biasing thereof at their ends for attainment of the effective leakage blocking, but actually it is sufficient if the stub ends of the squeegee rollers 51 and 57 as mounted on the inner face of the pressure plate section 24 are resiliently supported for biasing toward their cooperative rollers 50 and 56 respectively when the gate halves are closed together. It is indicated in the lower portion of FIG. 5, and in FIG. 6, that the inserted ribs 53a and 53b are equipped within their bottom edges with leaf springs 60a and 60b, and 61a and 61b. The stub axles of squeegee rollers 51 and 57 are mounted in slots that are arranged transversely to the bottom or inner nested edges of the insert ribs 53a and 53b, with the free resilient tip ends of these leaf springs applying upward or outward pressure against such stub axles for floating mount of these rollers with the desired resilient biasing. This is also particularly illustrated in FIG. 7 wherein it is indicated that stub axles 151a and 151b of squeegee roller 51 are spring biased upwardly or outwardly by the free ends of the leaf springs 61a and 61b. The stub axles of the cooperating squeegee roller 50 merely rotate freely in round holes which extend transversely through the ribs 53a and 53b for free rotation without right angular inward or outward play since there is no resilient mounting thereof.

It is indicated in FIGS. 1, 3, 5, 6, and 7 that between the pair of upper squeegee rollers 56 and 57 and the optical windows 13 and 26 transverse channels or bores 62 and 63 are formed respectively in the aperture plate 11 to serve as supply manifolds. It will be best understood from FIGS. 5 and 6 that these transverse bores 62 and 63 in the respective gate halves 11 and 22 are equipped with a series of transversely-spaced passage outlets 64 and 65 which communicate such transverse manifold passages to the top portions of the inner faces of the opposed sidewalls of the chamber 45, at points above the optical windows 13 and 26. The manifolds 62 and 63 are provided with blocking ends, as is indicated in FIG. 2, with the opposite ends thereof extending to and through the other side edges there to provide internally-threaded entrance ends 162 and 163 for mount therein of suitable threaded nipples 262 and 263 for respective connection thereto of liquid supply hoses 66 and 67 for feed of liquid to the chamber 45.

Below the windows 13 and 26 evacuating equipment is associated with the pair of squeegee rollers 50 and 51. preferably in the form of transverse channels 168 and 169 and their open ends 68 and 69 which are connected to suitable suction means, e.g., threaded fittings 268 and 269 suitably connected to evacuating or suction equipment to draw off the liquid in the chamber 45 for creating a sufficient differential in pressure with respect to the pressure of the liquid at the supply ducts 62 and 63 as to assure a flow of the liquid down into the chamber and then out through such evacuating systems. Preferably, such evacuating systems may include suction hoses 368 and 369 connected to the channel outlets 68 and 69 by the intervening fittings.

It is to be understood that the supply of solution or liquid to the chamber 45 need not be at a pressure that is appreciably above atmospheric pressure if evacuation by the suction apparatus creates an appreciably lower pressure in the evacuating equipment at the bottom or lower end of this chamber. As is understood in the liquid or wet gate art the solution preferably has a refractive index close to the refractive index of the support and emulsion of the strip film that is to be drafted through such gate. For example, such solution may be tetrachloroethylene. Such a wet gate unit should be enclosed within a housing which may be formed of plexiglass and the evacuating system thereof may be connected into an exhaust system that will minimize escape of fumes from the solution which might otherwise cause distress to the operators.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is the novel subjects matter defined in the following claims.

1. In a photographic strip film printer a wet gate assembly comprising:
   (1) a pair of complementary gate halves demountably fastened together to form between opposed faces thereof a through strip film path from top entrance ends down to bottom exit ends thereof;
   (2) a pair of light-transmitting optical windows having substantially aligned transverse central axes respectively fitted into one of a pair of opposed apertures separately formed in said gate halves with said windows located in transversely spaced-apart relation on opposite sides of said path to define a chamber therebetween;
   (3) cooperative leakage blocking means provided on the opposed faces of said gate halves along opposite sides of said windows closing the sides of said chamber;
   (4) transverse leakage blocking means cooperatively provided on the entrance ends of said gate halves for preventing leakage up out of the gate assembly chamber while permitting strip film to be drafted down therethrough between said transversely spaced windows;

(5) a pair of transverse manifolds each provided in one of said gate halves above the window in such gate half with each manifold having means adapted to be connectable to a source of pressurized liquid and provided with transversely spaced passage outlets communicating with the upper portion of the chamber;

(6) a pair of cooperating transverse squeegee rollers each rotatably mounted at the face of and by one of said gate halves below the window therein with at least an arcuate longitudinal zone of each roller extending laterally forward beyond the face of the gate half supporting it with the opposed arcuate longitudinal zones of said rollers biased toward longitudinal contact with each other, said rollers extending laterally to cooperating positions relative to said side leakage blocking means and in cooperative sealing relation with respect to each other for closure of the bottom of the chamber; and (7) means defining behind each of said rollers in the gate half supporting the latter a transverse channel connectable to suction means for drawing off liquid from the chamber at said rollers while substantially blocking leakage below the latter.

2. The wet gate assembly of claim 1 characterized by said means which rotatably mount said rollers being of a type which resiliently supports at least the ends of one of said transverse rollers relative to the other whereby a film strip that may be drafted down through said chamber and between said chamber and between said rollers will be in substantially liquid-tight contact with the latter while preventing undesirable liquid leakage thereat despite any particular thickness of the film and presence of lap joints therein.

3. The wet gate assembly of claim 1 characterized by said cooperative transverse leakage blockage means provided on the top entrance ends of said gate halves being in the form of a pair of cooperative, transverse, top squeegee rollers with one thereof mounted on the inner face of the top end of one of said halves above its liquid supply passage outlets and its window and the other thereof mounted in similar fashion on the inner face of the other of said halves.

4. The wet gate assembly of claim 3 characterized by means which rotatably mounts the ends of at least one of the pair of top squeegee rollers being of the type which resiliently supports said roller ends with biasing of this top roller toward its cooperative companion roller.

5. The wet gate assembly of claim 1 characterized by each of said transverse channels being a lateral and open-face groove in the concerned gate half of a vertical width greater than the diameter of the squeegee roller mounted threat with free nesting of the latter therein while providing space in said groove above and behind said roller for redy liquid evacuation therepast, said rollers in their nested positions within the open faces of said grooves having their opposed longitudinal arcuate zones resiliently biased toward contact with each other.

* * * * *